United States Patent
Nakayama et al.

(10) Patent No.: US 11,450,859 B2
(45) Date of Patent: Sep. 20, 2022

(54) CELL, CELL STACK UNIT, ELECTROCHEMICAL MODULE, AND ELECTROCHEMICAL APPARATUS

(71) Applicant: KYOCERA Corporation, Kyoto (JP)

(72) Inventors: Toru Nakayama, Kirishima (JP); Tetsuaki Ozaki, Kirishima (JP); Norimitsu Fukami, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 421 days.

(21) Appl. No.: 16/430,468

(22) Filed: Jun. 4, 2019

(65) Prior Publication Data
US 2019/0288296 A1     Sep. 19, 2019

Related U.S. Application Data

(63) Continuation of application No. 14/404,482, filed as application No. PCT/JP2013/065296 on May 31, 2013, now Pat. No. 10,355,282.

(30) Foreign Application Priority Data

May 31, 2012  (JP) .............................. JP2012-124476

(51) Int. Cl.
*H01M 4/86*      (2006.01)
*H01M 8/1246*    (2016.01)
*H01M 8/12*      (2016.01)

(52) U.S. Cl.
CPC ....... *H01M 4/8605* (2013.01); *H01M 8/1246* (2013.01); *H01M 2008/1293* (2013.01);
(Continued)

(58) Field of Classification Search
CPC ............ H01M 4/8605; H01M 8/1246; H01M 2008/1293; H01M 2300/0074; Y02E 60/50
(Continued)

(56) References Cited

U.S. PATENT DOCUMENTS 5,861,222 A      1/1999   Fischer et al.
7,300,718 B2    11/2007   Yamada et al.
8,785,079 B1 *   7/2014   Gross .................. C23C 18/1648
                                                    429/532
(Continued)

FOREIGN PATENT DOCUMENTS

CN       1964111 A     5/2007
JP      H0287469 A     3/1990
(Continued)

OTHER PUBLICATIONS

Wikipedia, the free encyclopedia, "Multimodal distribution", Nov. 5, 2015, XP055237765, Retrieved from the Internet: URL: https://en.wikipedia.org/wiki/Multimodal_distribution [retrieved on Dec. 21, 2015].

(Continued)

*Primary Examiner* — Bethany L Martin
*Assistant Examiner* — Kourtney R S Carlson
(74) *Attorney, Agent, or Firm* — Viering, Jentschura & Partner Mbb

(57) ABSTRACT

[Object] To provide a cell, a cell stack, an electrochemical module and an electrochemical apparatus that can suppress decrease in output power.
[Solution] A cell includes a solid oxide electrolyte layer 9, a fuel electrode layer 8 on one of the main surfaces of the electrolyte layer 9, and an oxygen electrode layer 10 on the other. The oxygen electrode layer 10 contains a plurality of pores, and the pore size distribution observed at a section of the oxygen electrode layer has at least three peaks (a first peak p1, a second peak p2 and a third peak p3). This structure leads to a cell, a cell stack, an electrochemical module and an electrochemical apparatus that can suppress decrease in output power.

16 Claims, 6 Drawing Sheets

(52) U.S. Cl.
CPC ...... *H01M 2300/0074* (2013.01); *Y02E 60/50* (2013.01); *Y02P 70/50* (2015.11)

(58) Field of Classification Search
USPC .................................................. 429/458, 482
See application file for complete search history.

(56) References Cited

U.S. PATENT DOCUMENTS

| | | | |
|---|---|---|---|
| 2004/0012913 | A1 | 1/2004 | Andelman |
| 2005/0095495 | A1 | 5/2005 | Yamada et al. |
| 2007/0178366 | A1 | 8/2007 | Mahoney et al. |
| 2011/0171563 | A1 | 7/2011 | Waki et al. |
| 2011/0217616 | A1 | 9/2011 | Wu et al. |
| 2011/0256464 | A1* | 10/2011 | Muramatsu ......... H01M 4/8621 429/465 |
| 2013/0171527 | A1* | 7/2013 | Lanning ................ H01M 4/861 429/405 |

FOREIGN PATENT DOCUMENTS

| | | |
|---|---|---|
| JP | H08130017 A | 5/1996 |
| JP | 2002231256 A | 8/2002 |
| JP | 2005141969 A | 6/2005 |
| JP | 2007220731 A | 8/2007 |
| JP | 2009522748 A | 6/2009 |
| JP | 2010108876 A | 5/2010 |
| WO | 2007082209 A2 | 7/2007 |
| WO | WO-2010050330 A1 * | 5/2010 ............ H01M 8/124 |

OTHER PUBLICATIONS

Soriano, "Separation of a Mixture Distribution Into Its Gaussian Components", ICLARM Contribution No. 456, Apr. 1990, pp. 35-40, XP055279849, Retrieved from the Internet: URL:http://pubs.iclarm.net/Naga/FB_3102.pdf [retrieved on Jun. 13, 2016].

Nagamoto et al., "Thin YSZ membrane prepared on porous cathode disk", Solid Oxide Fuel Cells (SOFC VI), Electrochemical Society Proceedings of the Sixth International Symposium, 1999, vol. 99, No. 19, pp. 163-171, XP055263307.

Hamedani et al., "Microstructure, property and processing relation in gradient porous cathode of solid oxide fuel cells using statistical continuum mechanics", Journal of Power Sources, vol. 196, Issue 15, Aug. 1, 2011, pp. 6325-6331.

* cited by examiner 24  21  25  20  26(22)

C
24
20
25

CELL, CELL STACK UNIT, ELECTROCHEMICAL MODULE, AND ELECTROCHEMICAL APPARATUS

CROSS-REFERENCE TO RELATED APPLICATIONS

The present application is a continuation of U.S. application Ser. No. 14/404,482, filed on Nov. 28, 2014, which is a national stage entry according to 35 U.S.C. 371 of PCT application No.: PCT/JP2013/065296 filed on May 31, 2013, which claims priority from Japanese application No.: 2012-124476 filed on May 31, 2012, which are entirely incorporated herein by reference.

TECHNICAL FIELD

The present invention relates to a cell such as a fuel cell, a cell stack unit including a plurality of cells electrically connected to one another with power collecting members therebetween, an electrochemical module including the cell stack unit contained in a housing, and an electrochemical apparatus including the electrochemical module.

BACKGROUND

Fuel cells that generate electric power using a fuel gas (hydrogen-containing gas) and an oxygen-containing gas (air in general) have recently been developed for next-generation energy. A fuel cell (hereinafter may be simply referred to as cell) includes a solid electrolyte layer disposed between a fuel electrode layer and an oxygen electrode layer. The cell generates electric power by delivering a fuel gas to the fuel electrode layer and an oxygen-containing gas to the oxygen electrode layer, and heating the cell to a temperature of 1000° C. to 1050° C. (see, for example, PTL 1).

Unfortunately, if such a cell is operated for a long time, some of the materials deteriorate due to high operation temperature and consequently cause power generation efficiency to decrease. Accordingly, PTL 2 discloses a technique for suppressing decrease in power output from the cell after a long-time use by controlling the structure of the oxygen electrode layer so as to contain grains having specific surface areas of 1.5 m$^2$/g to 9.0 m$^2$/g and pores having pore sizes in the range of 30 nm to 100 nm, thereby suppressing increase in reaction loss in the oxygen electrode layer.

CITATION LIST

Patent Literature

PTL 1: Japanese Unexamined Patent Application Publication No. 2002-231256
PTL 2: Japanese Unexamined Patent Application Publication No. 2010-108876

SUMMARY

Technical Problem

The decrease in output power, however, cannot be sufficiently suppressed only by controlling the specific surface area of the grains and the pore size in the oxygen electrode layer like PTL 2.

It is an object of the present invention to provide a cell and a cell stack unit that can suppress decrease in output power, and an electrochemical module and an electrochemical apparatus.

Solution to Problem

The cell of the present invention includes a fuel electrode layer on one side of a solid oxide electrolyte layer, and an oxygen electrode layer on the other side. The oxygen electrode layer contains a plurality of pores, and the distribution of the pores observed at a section of the oxygen electrode layer has at least three peaks.

The cell stack unit of the present invention includes a plurality of the cells electrically connected to one another with power collecting members therebetween. The electrochemical module of the present invention includes the cell stack contained in a housing, and the electrochemical apparatus of the present invention includes the electrochemical module.

Advantageous Effects of Invention

In the cell of the present invention, the oxygen electrode layer contains a plurality of pores, and the distribution of the pores observed at a section has at least three peaks. These pores produce the following effects. For example, small pores defining a first peak produce the effect of efficiently taking air in for power generation; middle-sized pores defining a second peak produce the effect of preventing the number of pores from decreasing gradually while the cell is used for a long-time; and large pores defining a third peak produce the effect of adjusting the porosity of the oxygen electrode layer, thereby helping efficient electric power generation and suppressing decrease in output power over a long time. The cell stack unit, electrochemical module and electrochemical apparatus including such cells also suppress decrease in output power.

BRIEF DESCRIPTION OF DRAWINGS

FIG. 1A is a cross-sectional view of the cell; and FIG. 1B is a side view of the cell when viewed in a direction from an interconnector layer to the cell.

FIG. 3A is a plot of two pore size distributions Ds and Dl estimated using scanning electron micrographs (SEM) taken at two different magnifications, and the total pore size distribution Dt of the two; and FIG. 3B is a plot illustrating how to estimate pore size distributions corrected using the total pore size distribution.

FIG. 4A is a side view of the cell stack unit; and FIG. 4B is a cross-sectional view of the portions indicated by dashed lines in FIG. 4A.

DETAILED DESCRIPTION (Cell)

Figure 1A:
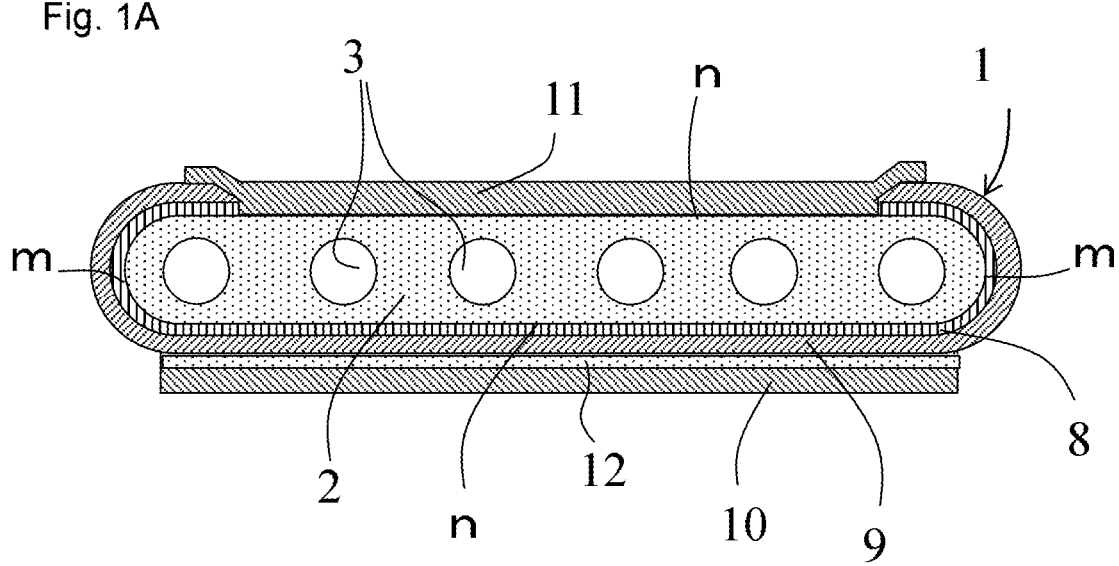
FIGS. 1A and 1B show the structure of a cell of an embodiment.
Figure 1B:
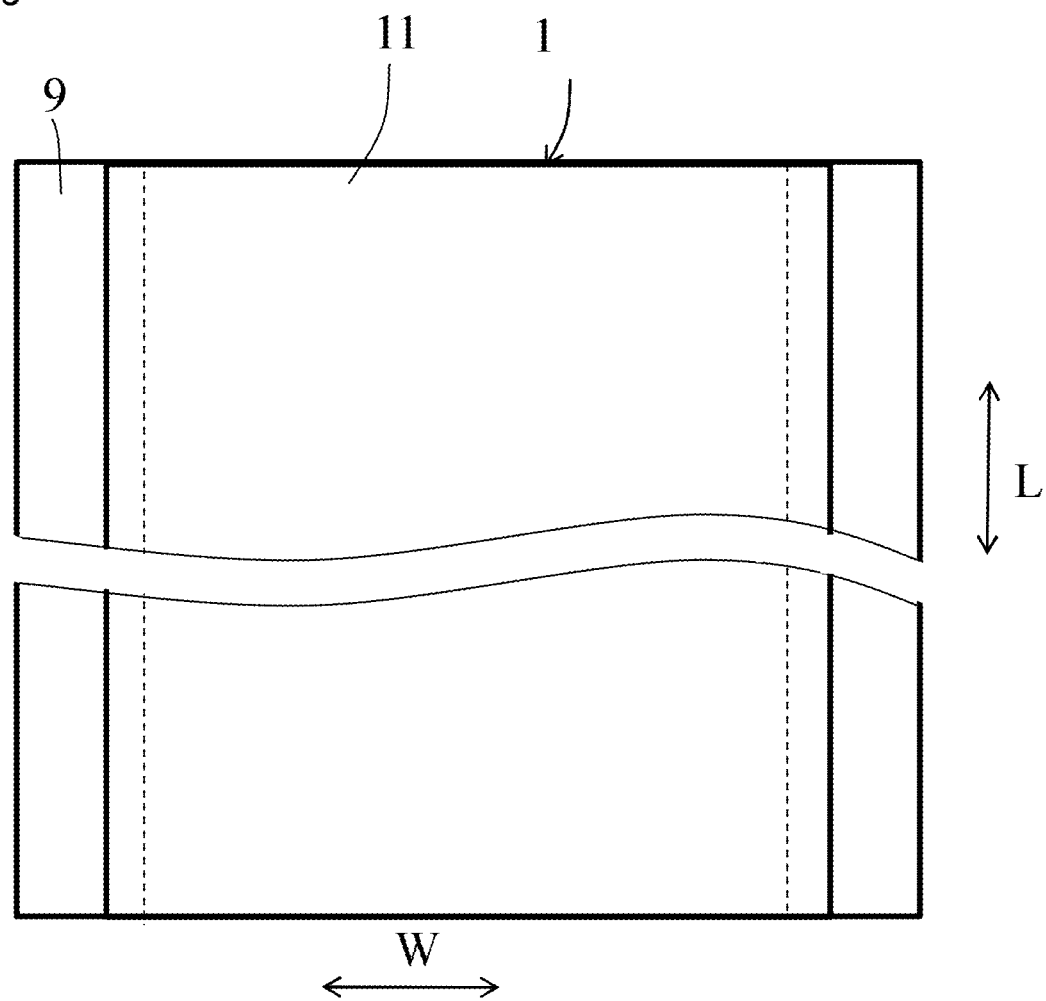

FIGS. 1A and 1B show the structure of a solid oxide cell 1 of an embodiment: FIG. 1A is a cross-sectional view of the cell; and FIG. 1B is a side view of the cell when viewed in a direction from an interconnector layer. In these two views, some of the components of the cell 1 are enlarged.

The cell 1 is what is called a hollow flat fuel cell, and includes a porous electroconductive supporting member (hereinafter simply referred to as supporting member) 2 in an elliptic columnar overall shape having a depressed oval cross-section. More specifically, the supporting member 2 includes a pair of flat faces n parallel to each other and a pair of arc-shaped faces (side faces) m each connecting the pair of flat faces n, as is clear from the shape shown in FIGS. 1A and 1B. The pair of flat faces n are substantially parallel to each other.

A plurality of fuel gas passages 3 pass through the inside of the supporting member 2 in the vertical direction L at certain intervals. The cell 1 also includes other members described below surrounding the periphery of the supporting member 2.

More specifically, the supporting member 2 is provided with a porous fuel electrode layer 8 disposed so as to cover one of the flat faces n (lower face in FIG. 1A) and both arc-shaped faces m, as shown in FIG. 1A. In addition, a solid oxide electrolyte layer 9 is disposed so as to cover the fuel electrode layer 8. Furthermore, a porous oxygen electrode layer 10 opposes the fuel electrode layer 8 with an intermediate layer 12 therebetween, along the flat face n (lower face in FIG. 1A) outside the electrolyte layer 9. In other words, the electrolyte layer 9 is disposed between the fuel electrode layer 8 and the oxygen electrode layer 10 in such a manner that the fuel electrode layer 8 is disposed on one of the main surfaces of the electrolyte layer 9, while the oxygen electrode layer 10 is disposed on the other. The intermediate layer 12 is intended to enhance the adhesion between the electrolyte layer 9 and the oxygen electrode layer 10 and to prevent a high-resistance reaction layer from being formed by a reaction between a constituent of the electrolyte layer 9 and a constituent of the oxygen electrode layer 10.

On the other flat face n (upper face in FIG. 1A) of the supporting member 2 not provided with the fuel electrode layer 8 or the electrolyte layer 9, an interconnector layer 11 is disposed with an adhesion layer (not shown) therebetween. The adhesion layer is intended to reduce the difference in thermal expansion coefficient between the interconnector layer 11 and the supporting member 2. In other words, the fuel electrode layer 8 and the electrolyte layer 9 extend over one (lower face in FIG. 1A) of the flat faces n to part of the other (upper face) through both the arc-shaped faces m, and the ends of the interconnector layer 11 are disposed on and joined to the both ends of the electrolyte layer 9. Thus, the electrolyte layer 9 and the interconnector layer 11 surround the supporting member 2, thereby preventing the fuel gas passing through the supporting member from leaking. In other words, the electrolyte layer 9 is a boundary separating the fuel gas delivered to the fuel electrode layer 8 from the oxygen-containing gas delivered to the oxygen electrode layer 10.

In the side view shown in FIG. 1B, the interconnector layer 11 having a rectangular shape in plan view is disposed so as to cover the supporting member 2 in the L direction from the upper end to the lower end, and both ends in the lateral direction of the interconnector layer 11 are joined to the electrolyte layer 9 so as to cover the surfaces of the ends of the electrolyte layer 9.

In the cell 1, the portion of the fuel electrode layer 8 and the portion of the oxygen electrode layer 10 opposing each other with the electrolyte layer 9 therebetween function as electrodes to generate electric power. More specifically, electric power is generated by delivering an oxygen-containing gas, such as air, outside the oxygen electrode layer 10 and delivering a fuel gas (hydrogen-containing gas) to the fuel gas passages 3 within the supporting member 2 to supply the fuel gas (hydrogen-containing gas) to the fuel electrode layer 8, and heating the fuel electrode layer 8 to a predetermined operation temperature. Then, the interconnector layer 11 collects the current generated by this power generation.

(Description of Members)

The oxygen electrode layer 10 of the present embodiment is made of an electroconductive ceramic containing what is called an $ABO_3$ perovskite oxide. Examples of such a perovskite oxide include La-containing transition metal perovskite oxides, and particularly $LaMnO_3$-, $LaFeO_3$-, and $LaCoO_3$-based oxides containing Sr in the A site. $LaCoO_3$-based oxides have high electrical conductivity at operation temperatures in the range of about 600° C. to 1000° C. and are therefore suitable. The B site of such a perovskite oxide may be a solid solution of Co and Fe or Mn.

The oxygen electrode layer 10 must be permeable to gas. In the present embodiment, the oxygen electrode layer 10 has an open porosity of 20% or more, particularly in the range of 30% to 50%. The oxygen electrode layer 10 desirably has a thickness of 30 μm to 100 μm from the viewpoint of collecting current.

Figure 2A:
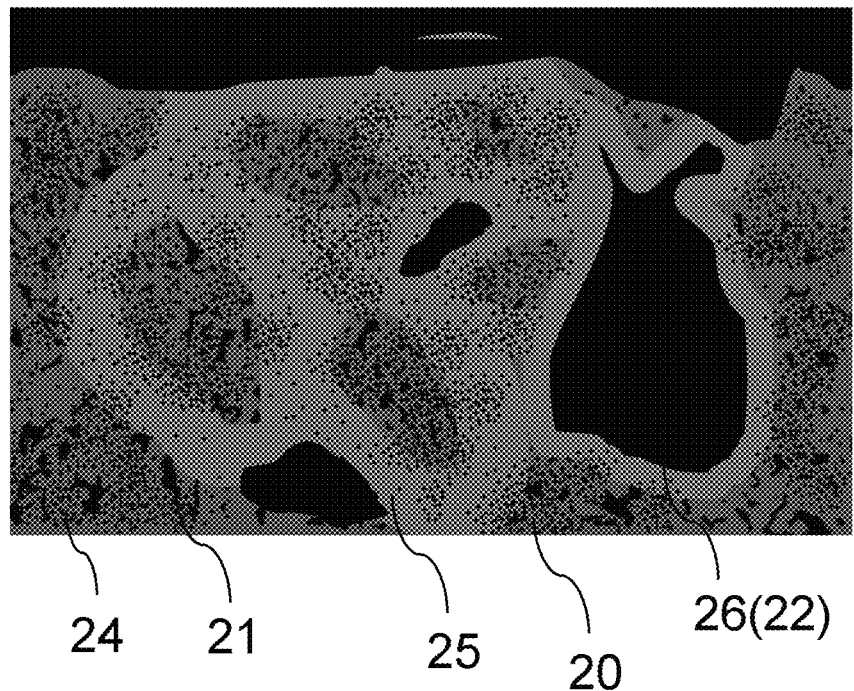
FIG. 2A is a sectional photograph of an exemplary oxygen electrode layer used in the cell shown in FIGS. 1A and 1B.
Figure 2B:
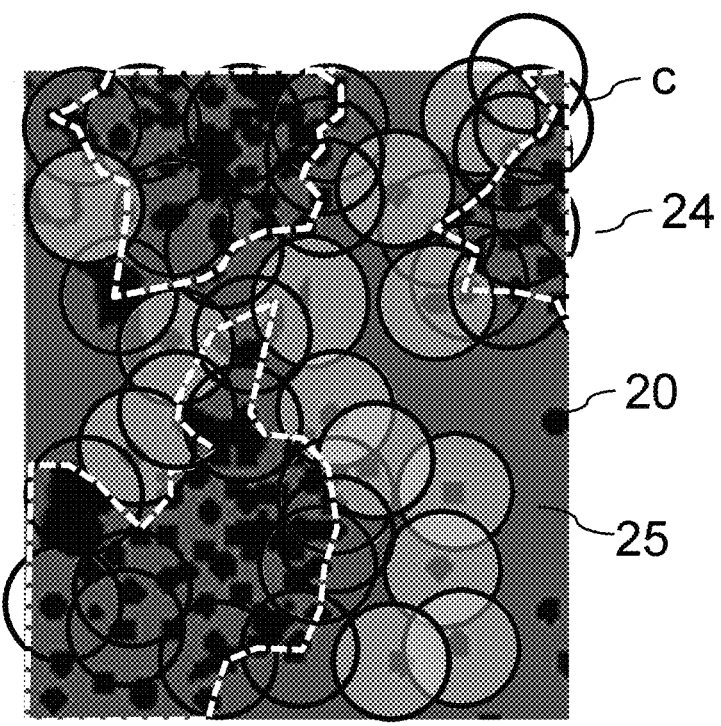
FIG. 2B is a representation illustrating the identification of boundaries between porous portions and dense portions in the oxygen electrode layer.
Figure 3A:
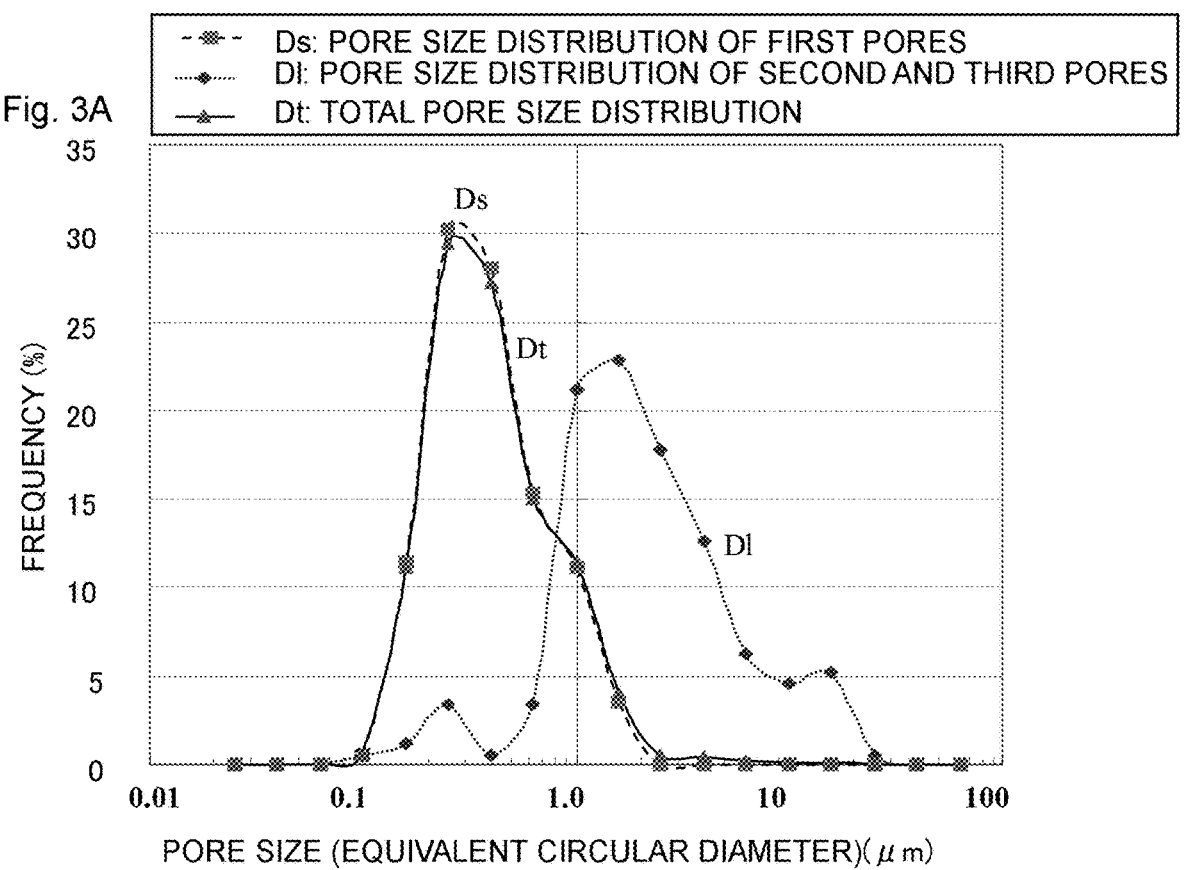
FIGS. 3A and 3B show pore size distributions in the oxygen electrode layer shown in FIGS. 2A and 2B.
Figure 3B:
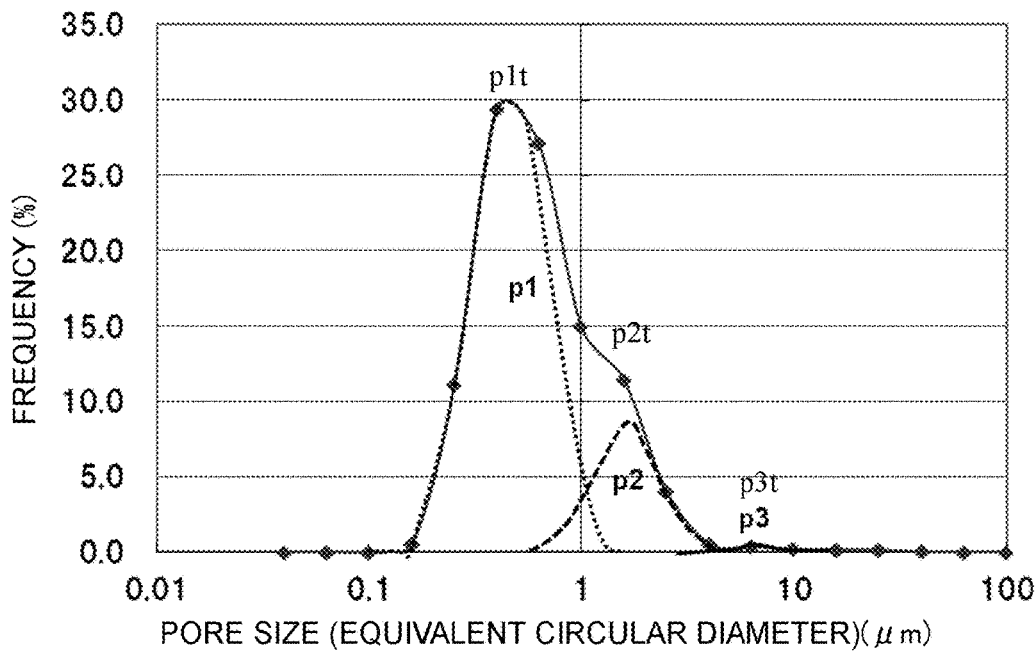

In the present embodiment, the oxygen electrode layer 10 has many pores, as shown in the sectional photograph of an oxygen electrode layer 10 in FIGS. 2A and 2B. The pores have a pore size distribution having three peaks: a first peak p1; a second peak p2; and a third peak p3, in the ascending order of the pore size, as shown in FIG. 3B. A peak mentioned herein does not refer to only the largest value of a peak curve, but refers to the entire peak curve including values at the feet of the peak curve extending from the point of the largest value. In the present embodiment, pores defining the first peak p1, pores defining the second peak p2 and pores defining the third peak p3 are defined as first pores 20, second pores 21 and third pores 22, respectively. In the present embodiment, the number of peaks is not limited to three and may be four or more. The following description will deal with the case of three peaks.

The pores 20 defining the first peak p1 increase the air content in the oxygen electrode layer 10 effectively, and efficiently take in air while the cell 1 is used, thus having the effect of increasing power generation efficiency. The first pores 20 in the oxygen electrode layer 10 tend to disappear gradually when the cell 1 is operated. On the other hand, the presence of the second pores 21 defining the second peak p2 reduces the deformation of the grains of the oxygen electrode layer 10, and thus delays the disappearance of the first pores 20 from the oxygen electrode layer 10. Consequently, the air flowing in the oxygen electrode layer 10 can be prevented from decreasing in amount with the passage of time even the cell 1 is used for a long time. Thus, the second pores have the effect of suppressing the decrease in power generation efficiency with the passage of time. Furthermore, the third pores 22 defining the third peak p3 control the porosity of the oxygen electrode layer 10 to optimize the amount of air flowing in the oxygen electrode layer 10, thus having the effect of increasing power generation efficiency. In other words, the pore size distribution in the oxygen electrode layer 10 having three peaks 3 enable the oxygen electrode layer 10 to impart high power generation performance and makes it difficult to degrade the high power generation performance, keeping it over a long time.

In the present embodiment, the pore size distribution is measured as described below. First, the structure of a polished section of the oxygen electrode layer 10 is observed through a scanning electron microscope (SEM) at a magnification of 500 to 1000 times, and pores (mainly third pores 22 and second pores 21) in a view are identified. Thus, a pore size distribution (Dl in FIG. 3A) at a low magnification is obtained from the size and number of the pores. Subsequently, a pore size distribution (Ds in FIG. 3A) at a high magnification is obtained from the size and number of the pores (mainly the first pores 20) observed in a view through the SEM at a magnification increased to 1500 to 5000 times. For obtaining the pore size distributions by the low-magnification observation and the high-magnification observation, for example, some of the second pores 21 may be observed by the high-magnification observation. These two pore size distributions are combined into a total pore size distribution (Dt in FIG. 3A) of the oxygen electrode layer 10. At this time, Dl and Ds are combined into Dt by multiplying the number of pores in each pore size distribution by a factor corresponding to the ratio of the area of the measured region of the pore size distribution (Dl) at a low magnification to the area of the measured region of the pore size distribution (Ds) at a high magnification. For the measurement of pore size, the pore size is defined by the equivalent circular diameter that is a diameter of a circle converted from the shape of each pore by image analysis.

Each of the peaks of the total pore size distribution (Dt) may be assumed to be in a normal distribution. The peaks are then corrected by peak separation as shown in FIG. 3B, and thus a pore size distribution is obtained. For each magnification, arbitrary five points are observed, and the largest value of each peak and the percentage of the number of pores are calculated using the average of the measurements.

According to the present embodiment, the above-described effect is notably produced when the largest values of the peaks lie in the following regions: the largest value p1$t$ of the first peak p1 lies at a pore size in the range of 0.02 μm to 1 μm; the largest value p2$t$ of the second peak p2, in the range of 1 μm to 5 μm; and the largest value p3$t$ of the third peak p3, in the range of 4 μm to 25 μm. In the case of four or more peaks, the peaks are grouped into three peaks of a first, a second and a third peak according to the positions of the largest values.

In the present embodiment, the number of the first pores 20 accounts for 80% to 90% of the number of all pores; the number of the second pores 21 accounts for 9% to 19% of the number of all pores; and the number of the third pores 22 accounts for 0.3% to 2% of the number of all pores. These values can be calculated by comparing the areas of the peaks p1, p2 and p3 (see FIG. 3B) separated by peak separation of the total pore size distribution (Dt). Hence, when the area of the first peak p1 accounts for 80% to 90%; the area of the second peak p2 accounts for 9% to 19%; and the area of the third peak p3 accounts for 0.3% to 2%, the above-described effect is efficiently produced.

In the present embodiment, the largest value p1$t$ of the first peak p1 lies at a pore size in the above range of 0.02 μm to 1 μm, particularly 0.15 μm to 0.6 μm. When the largest value p1$t$ of the first peak p1 lies in such a range, the deformation of the grains of the oxygen electrode layer 10 can be small even if the cell 1 is operated with the grains having been insufficiently sintered. Accordingly, the constituents of the oxygen electrode layer 10 are inhibited from being partially diffused to migrate to the intermediate layer 12 and the electrolyte layer 9 by the operation of the cell 1, and thus a high-resistance compound such as $SrZrO_3$ phase is prevented from being formed between the intermediate layer 12 and the oxygen electrode layer 10. Consequently, the decrease in power generation efficiency of the cell 1 can be suppressed. In addition, the specific surface area of the oxygen electrode layer 10 is increased, and accordingly the amount of oxygen supply is increased. Consequently, the cell 1 exhibits high power generation efficiency.

In the present embodiment, preferably, the pores present within the range of the second peak p2 include flat pores having aspect ratios in the range of 3 to 10. It is particularly advantageous that the average aspect ratio of the second pores 21 having pore sizes from the pore size corresponding to the largest value p2$t$ of the second peak p2 to the maximum pore size of the second peak p2 is in the range of 3 to 10. Under this condition, the deformation of the grains of the oxygen electrode layer 10 can be small even when the cell 1 is operated. For the average aspect ratio of the second pores 21 having pore sizes from the pore size corresponding to the largest value p2$t$ of the second peak p2 to the maximum pore size of the second peak p2, the pores having pore sizes form the pore size corresponding to the largest value p2$t$ of the second peak p2 to the maximum pore size of the second peak p2 are identified in a micrograph of the oxygen electrode layer 10. Then, the largest length of each of the identified second pores 21, and the width of the second pore 21 perpendicular to the largest length are measured. The aspect ratio: (largest length of a second pore 21)/(width of the corresponding second pore 21) is calculated for each second pore 21, and the results are averaged into the average aspect ratio. In the present embodiment, the average aspect ratio of the first pores 20 having pore sizes from the pore size corresponding to the largest value p1$t$ of the first peak p1 to the minimum pore size of the first peak p1 is in the range of 1 to 3. Thus the specific surface area of the oxygen electrode layer 10 is increased, and accordingly the amount of oxygen supply is increased. Consequently, the cell 1 exhibits high power generation efficiency.

Furthermore, in the present embodiment, the structure of the oxygen electrode layer 10 includes porous portions 24, dense portions 25 and empty portions 26, as shown in FIG. 2A. Each porous portion 24 has many first pores 20 and functions to efficiently take in air when the cell 1 is used, thus producing the effect of increasing the power generation efficiency. The dense portion 25 hardly has pores, and accordingly, the deformation thereof with the passage of time is small even if the cell 1 is used for a long time. The dense portion 25 thus suppresses the deformation of the porous portion 24 with the passage of time, and accordingly hinders the disappearance of the first pores 20 from the porous portion 24, resulting from the shrinkage of the porous portion 24 by the operation of the cell 1. Consequently, the dense portion produces the effect of making it difficult to vary the porosity of the oxygen electrode layer 10 with the passage of time and suppressing the decrease in power generation efficiency with the passage of time. The empty portions 26 control the overall porosity of the oxygen electrode layer 10, thus having the effect of helping efficient power generation and increasing the power generation efficiency. Thus, the oxygen electrode layer 10 imparts high power generation performance and makes it difficult to degrade the high power generation, keeping it over a long time.

Thus, the porous portions 24 are regions where many first pores 20 are present. The second pores 21 are present within the porous portions 24 or between the porous portions 24 and the dense portions 25. The dense portions 25 are regions where the first pores 20 are hardly present. Each empty portion 26 refers to a region defined by a pore having a pore size of 10 µm or more. The boundaries among the porous portions 24, the dense portions 25 and the empty portions 26 are determined as below. First, pores having pore sizes of 10 µm or more are defined as empty portions 26. Next, boundaries between porous portions 24 and dense portions 25 are determined by observing the oxygen electrode layer 10 through an SEM at a magnification of 1500 to 3000 times. For determining the boundary between a porous portion 24 and a dense portion 25, circles c having a radius of 3 times the pore size corresponding to the largest value p1$t$ of the first peak 20 are formed around the first pore 20. The porous portion 24 is defined as a region surrounded by a line connecting the centers of the outermost ones of the overlapping circles c each in which pores accounts for 15% or more of the area of the circle (regions surrounded by the white dotted lines in FIG. 2B). The region except the porous portions 24 and the empty portions 26 is defined as the dense portion 25. The dense portion 25 is formed by being surrounded by the porous portions 24 and the empty portions 26 and is, in the present embodiment, in the form of frames. If a portion of a circle c lies outside the oxygen electrode layer 10 at the end of the oxygen electrode layer 10, the area of the pores is estimated in the region other than the portion outside the oxygen electrode layer 10.

When the dense portion 25 has a perimeter length 10 times or more the pore size of the first pores 20, the deformation of the dense portion 25 with the passage of time is further reduced. Also, when the dense portion 25 is long and thin with the ratio: (square of the perimeter length of the dense portion 25)/(area of the dense portion 25) is in the range of 40 to 100, the porosity of the oxygen electrode layer 10 can be optimized and the decrease in porosity with the passage of time can be reduced. If there are a plurality of dense portions 25, the average of the perimeter lengths of the dense portions 25 is used for calculation.

In the present embodiment, the porous portions 24 account for 25% to 55%; the dense portion 25 accounts for 15% to 35%; and the empty portions 26 account for 10% to 60%. When these ranges hold true, the above-described effects are efficiently produced. From the viewpoint of reducing the decrease in porosity with the passage of time, it is desirable that the dense portion 25 surround the porous portions 24. The dense portion 25, however, may be present in a region other than the peripheries of the porous portions 24. Even in this case, the effect of reducing the decrease in porosity with the passage of time is not lost.

The intermediate layer 12 is disposed between the oxygen electrode layer 10 and the electrolyte layer 9 to prevent reactions between these layers. In the present embodiment, the intermediate layer is made of $CeO_2$-based sintered compact containing a rare-earth element other than Ce, having a composition expressed by, for example, $(CeO_2)_{1-x}(REO_{1.5})_x$ (in the formula, RE represents at least one of Sm, Y, Yb and Gd, and x represents a figure satisfying $0 < x \leq 0.3$). From the viewpoint of reducing electrical resistance, Sm or Gd is used as RE. For example, the intermediate layer is made of a $CeO_2$ solid solution containing 10% to 20% by mole of $SmO_{1.5}$ or $GdO_{1.5}$.

The supporting member 2 is required to be permeable to gas so as to allow the fuel gas to permeate into the fuel electrode layer 8, and to be electrically conductive so as to be connected to the interconnector layer 11 for current collection. Hence, the supporting member 2 may be made of an electroconductive ceramic, a cermet or the like. The supporting member 2 preferably has an electrical conductivity of 300 S/cm or more, particularly 440 S/cm or more, and an open porosity of 30% or more, particularly 35% to 50%, from the viewpoint of gas permeability.

The supporting member 2 is formed of an iron group metal and an inorganic oxide, for example, Ni and/or NiO and a specific rare-earth metal oxide if it is fired simultaneously with the fuel electrode layer 8 or the electrolyte layer 9 in the manufacture of the cell 1. The specific rare-earth metal oxide is used for bringing the thermal expansion coefficient of the supporting member 2 close to the thermal expansion coefficient of the electrolyte layer 9, and is a rare-earth metal oxide containing at least one element selected from the group consisting of Y, Lu, Yb, Tm, Er, Ho, Dy, Gd, Sm and Pr. The rare-earth metal oxide may be used in combination with Ni and/or NiO. Examples of such a rare-earth metal oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. In particular, at least one of $Y_2O_3$ and $Yb_2O_3$ may be selected because these oxides hardly form solid solution with or react with Ni and/or NiO, and because they have thermal expansion coefficients similar to the thermal expansion coefficient of the electrolyte layer 9 and are inexpensive. From the viewpoint of maintaining a good electrical conductivity of the supporting member 2 and bringing the thermal expansion coefficient close to that of the electrolyte layer 9, in the present embodiment, the volume ratio of Ni and/or NiO to the rare-earth metal oxide in the supporting member 2 is in the range of 35:65 to 65:35. The supporting member 2 may further contain other metals or oxides within a range in which required properties are not degraded.

In the present embodiment, furthermore, the flat faces n of the supporting member 2 each have a length (length in the width direction W of the supporting member 2) of 15 mm to 35 mm, and the arc-shaped faces m each have a length (length of the arcs) of 2 mm to 8 mm. The thickness of the supporting member 2 (thickness between the flat faces n) is 1.5 mm to 5 mm, and the length of the supporting member 2 in the L direction is 100 mm to 150 mm. The supporting member 2 is not limited to a hollow flat type as shown in FIG. 1A, FIG. 1B or 4 and may have a cylindrical or plate-like shape as long as it is columnar.

The fuel electrode layer 8 is intended to cause an electrode reaction, and is made of a porous electroconductive ceramic in the present embodiment. For example, such a material may be a combination of a $ZrO_2$ solid solution containing a rare-earth element and Ni and/or NiO, or a combination of a $CeO_2$ solid solution containing any other rare-earth element and Ni and/or NiO. The rare-earth element may be any one of the rare-earth elements cited as the rare-earth element used for the supporting member 2. For example, a Y-containing $ZrO_2$ solid solution (YSZ) and Ni and/or NiO may be used as the material. In the present embodiment, the content of a $ZrO_2$ solid solution containing a rare-earth element or a $CeO_2$ solid solution containing any other rare-earth element in the fuel electrode layer 8 is 35% to 65% by volume, and the content of Ni and/or NiO is 65% to 35% by volume. Furthermore, the fuel electrode layer 8 has an open porosity of 15% or more, particularly in the range of 20% to 40%, and a thickness of 1 µm to 30 µm.

The fuel electrode layer 8 is disposed so as to oppose the oxygen electrode layer 10. For example, the fuel electrode layer 8 may be disposed only on the lower flat face n without extending to the upper flat face n across the arc-shaped faces m as shown in FIG. 1A.

The electrolyte layer 9 has a function as an electrolyte through which electrons move between the fuel electrode layer 8 and the oxygen electrode layer 10, and is also required to have an ability to block gas so as to prevent the leakage of the fuel gas and the oxygen-containing gas. In the present embodiment, the electrolyte layer is made of a ceramic (solid oxide) of partially stabilized or stabilized $ZrO_2$ containing 3% to 15% by mole of a rare-earth element such as Y, Sc or Yb. As the rare-earth element, Y is used because it is inexpensive. The electrolyte layer 9 may be made of, for example, a $LaGaO_3$-based material, and, of course, may be made of other materials as long as it can have the above-describe characteristics. In the present embodiment, the thickness of the electrolyte layer 9 is 20 µm to 40 µm. In particular, the thickness of the electrolyte layer 9 is 30 µm to 40 µm from the viewpoint of reducing the permeation of gases.

The interconnector layer 11 is made of an electroconductive ceramic. Since the interconnector layer 11 comes in contact with the fuel gas (hydrogen-containing gas) and the oxygen-containing gas, it is resistant to reduction and oxidation. Accordingly, the interconnector layer 11 is generally made of a $LaCrO_3$-based perovskite oxide, and particularly a $LaCrMgO_3$-based oxide containing Mg in the B site from the viewpoint of bringing the thermal expansion coefficient close to those of the supporting member 2 and the electrolyte layer 9. The material is however not limited to these materials.

The interconnector layer 11 must be dense from the viewpoint of preventing the leakage of the fuel gas flowing through the fuel gas passage 3 in the supporting member 2 and the oxygen-containing gas flowing outside the supporting member 2. In the present embodiment, the interconnector layer 11 has a relative density of 93% or more, particularly 95% or more. In the present embodiment, in addition, the interconnector layer 11 has a thickness of 10 µm to 50 µm from the viewpoint of preventing the leakage of gases and of electrical resistance.

The adhesion layer (not shown) has a similar composition to the fuel electrode layer 8. For example, the adhesion layer may contain at least one of a rare-earth metal oxide, a $ZrO_2$ solid solution containing a rare-earth element and a $CeO_2$ solid solution containing any other rare-earth element, and Ni and/or NiO. More specifically, the adhesion layer may have, for example, a composition containing $Y_2O_3$ and Ni and/or NiO, a composition containing a Y-containing $ZrO_2$ solid solution (YSZ) and Ni and/or NiO, or a composition containing a $CeO_2$ solid solution containing Y, Sm, Gd or the like and Ni and/or NiO. In the present embodiment, the volume ratio of the rare-earth metal oxide or $ZrO_2$ ($CeO_2$) solid solution containing a rare-earth element to the Ni and/or NiO is in the range of 40:60 to 60:40.

(Manufacturing Method)

An exemplary method for manufacturing the cell 1 of the present embodiment will now be described.

First, for example, Ni and/or NiO powder, powder of a rare-earth metal oxide such as $Y_2O_3$, an organic binder, and a solvent are mixed to prepare a clay, and the clay is formed into an electroconductive supporting member compact by extrusion, followed by drying. The electroconductive supporting member compact may be calcined into a calcined compact at a temperature of 900° C. to 1000° C. for 2 to 6 hours.

Next, for example, NiO and an $Y_2O_3$-containing $ZrO_2$ solid solution (YSZ) are weighed out according to a predetermined composition, and are mixed. Then, an organic binder and a solvent are added to the mixed powder to prepare a slurry for forming the fuel electrode layer.

Also, toluene, a binder powder (having a higher molecular weight than the below-described binder powder to be attached to $ZrO_2$ powder, for example, an acrylic resin), and a commercially available dispersant are added to a powder of a $ZrO_2$ solid solution containing a rare-earth element to yield a slurry. The slurry is formed into a sheet of an electrolyte layer compact by a doctor blade method or the like.

Then, the slurry for the fuel electrode layer is applied to the surface of the sheet of the electrolyte layer compact and dried into a fuel electrode layer compact, thus forming a multilayer composite sheet. The fuel electrode layer compact of the multilayer composite sheet including the fuel electrode layer compact and the electrolyte layer compact is put on the surface of the electroconductive supporting member compact to yield a composite compact.

Subsequently, the material of the interconnector layer (for example, $LaCrMgO_3$-based oxide powder), an organic binder, and a solvent are mixed into a slurry. In the subsequent process described below, a cell including an adhesion layer will be manufactured.

An adhesion layer compact that will be disposed between the supporting member 2 and the interconnector layer 11 is formed. For example, an Y-containing $ZrO_2$ solid solution and NiO are mixed in a volume ratio in the range of 40:60 to 60:40, followed by drying. An organic binder and other constituents are added to the mixture to prepare an adhesion layer slurry. The slurry is applied to the electroconductive supporting member compact between the ends of the electrolyte layer compact, thus forming the adhesion layer compact.

Then, an intermediate layer that will be disposed between the electrolyte layer and the oxygen electrode layer is formed. For example, $GdO_{1.5}$-containing $CeO_2$ solid solution powder is heat-treated at a temperature of 800° C. to 900° C. for 2 to 6 hours to prepare a material powder of an intermediate layer compact. Toluene is added as the solvent to the material powder to yield a slurry for forming the intermediate layer. The slurry is applied to the surface of the electrolyte layer compact to form an intermediate layer compact. Alternatively, an intermediate layer compact may be formed in a sheet form and is then stacked on the electrolyte layer compact. The flurry of the intermediate layer may be applied to the surface of the sheet of the electrolyte layer compact not provided with the fuel electrode layer compact, followed by drying. Thus, a multilayer composite compact may be formed which includes the fuel electrode layer compact on one of the surfaces of the sheet of the electrolyte layer compact and the intermediate layer compact on the other. Then, the fuel electrode layer compact of the multilayer composite compact is put on the electroconductive supporting member compact.

Then, the interconnector layer slurry is applied to the surface of the adhesion layer compact so that the both ends of the interconnector layer compact are disposed on the ends of the electrolyte layer compact, thus forming a multilayer composite compact.

Subsequently, binders are removed from the multilayer composite compact, and the multilayer composite compact is subjected to simultaneous sintering (simultaneous firing) at a temperature of 1400° C. to 1450° C. in an atmosphere containing oxygen for 2 to 6 hours. Alternatively, the slurry of the interconnector layer, after being prepared, may be formed into a sheet for the interconnector layer, and this sheet is put on the adhesion layer compact in such a manner that the ends of the sheet are disposed on the ends of the electrolyte layer compact, thus forming the multilayer composite compact.

For the material of the oxygen electrode layer (for example, $LaCoO_3$-based oxide powder), secondary particles of the material that are aggregates of primary particles of the material are prepared and pulverized. At this time, the particle size of the pulverized secondary material powder is adjusted so that the particle size distribution curve of the secondary particles is not sharp and has at least two peaks. For example, the particle size of the secondary material powder is adjusted to a particle size distribution having D10 of 0.01 μm to 1 μm, D50 of 0.3 μm to 10 μm, and D90 of 5 μm to 50 μm when measured by a microtrac method. If a uniform secondary material powder having a narrow normal particle size distribution is used, the oxygen electrode layer after sintering has a pore size distribution having no second peak and has a structure including no dense portion. D10, D50 and D90 refer to particle sizes in the particle distribution of the secondary material powder measured by a microtrac method at 10%, 50%, and 90% of the number of all particles, counted in ascending order of the particle size. In order to control the particle size distribution of the secondary material powder of the oxygen electrode layer in such ranges, the period of time for pulverizing the material may be controlled, or, in a case, a secondary material adjusted to a larger particle size by recalcination or the like may be added to a finer secondary material having a uniform particle size distribution.

In the present embodiment, the material powder of the oxygen electrode layer is prepared by liquid-phase synthesis such as coprecipitation, Pechini method (organic acid salt burning), or a citrate method. The material powder prepared by a liquid phase synthesis exhibits high crystallinity, and does not allow a large amount of byproduct phase to be present therein or atoms in the byproduct phase to diffuse when the material is fired or when the cell is operated, consequently suppressing the deformation of the grains of the oxygen electrode layer.

The thus prepared material, a solvent and a pore-forming agent are mixed into a slurry, and the oxygen electrode layer is formed by applying the slurry to the surface of the intermediate layer by dipping, printing or the like, and then burning the slurry at a temperature of 1000° C. to 1200° C. for 2 to 6 hours. Thus, the cell 1 of the present embodiment having the structure shown in FIGS. 1A and 1B is completed. Then, preferably, hydrogen gas is delivered to the cell 1 to reduce the supporting member 2 and the fuel electrode layer 8. This reduction treatment is preferably performed, for example, at a temperature of 750° C. to 1000° C. for 5 to 20 hours.

(Cell Stack Unit)

Figure 4A:
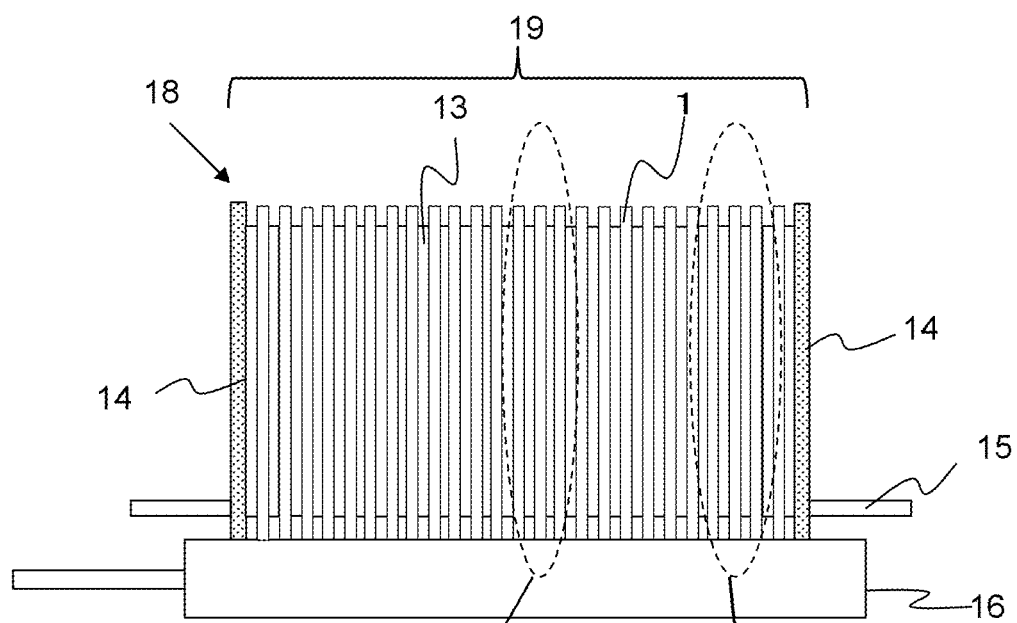
FIGS. 4A and 4B show a cell stack unit including the cells shown in FIGS. 1A and 1B.
Figure 4B:
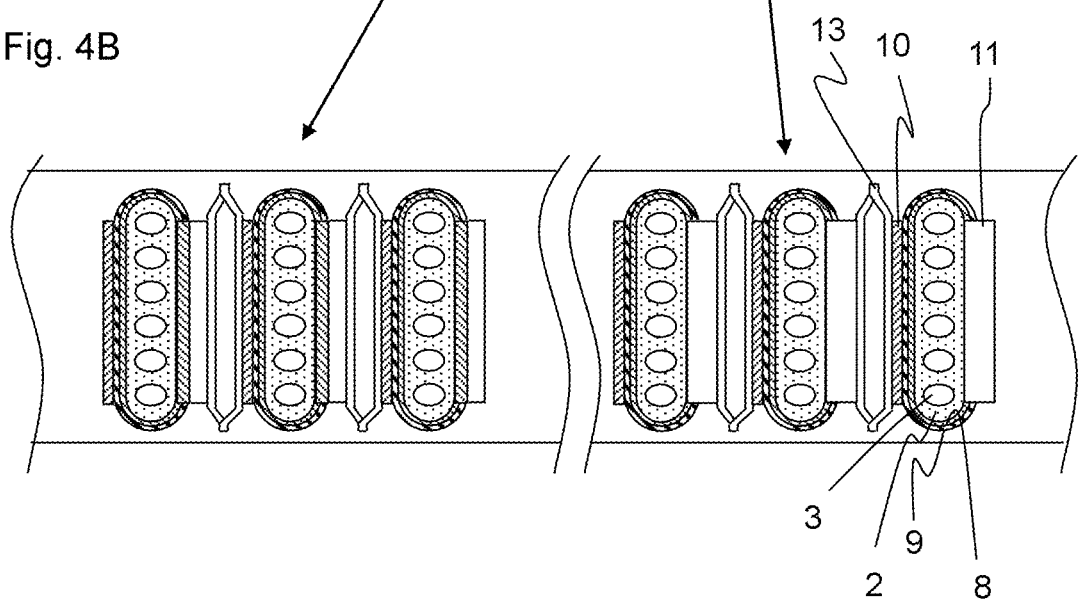

FIGS. 4A and 4B shows a cell stack unit in which a plurality of the cells 1 are electrically connected to one another with power collecting members 13 therebetween: FIG. 4A is a schematic side view of the cell stack unit 18; and FIG. 4B is a sectional view of the portions indicated by the dashed lines of the cell stack unit 18 shown in FIG. 4A, showing only the portions surrounded by the dashed lines of FIG. 4A. For the sake of specifically indicating the portions in FIG. 4B corresponding to the portions surrounded by the dashed lines of FIG. 4A, that portions are indicated by the arrows, and some members such as the intermediate layer 12 are omitted from the cell 1 shown in FIG. 4B.

The cell stack unit 18 includes a cell stack 19 of plurality of cells 1 arranged parallel to each other. The cells 1 are connected one another with power collecting members 13 therebetween. Also, the arrangement of the cells 1 is provided with elastically deformable electroconductive members 14 at both ends of the arrangement in such a manner that the cells 1 are disposed between the electroconductive members 14. Also, a current extraction portion 15 is connected to each electroconductive member 14 for extracting the current generated by power generation of the cell stack 19 (cells 1). The lower ends of the cells 1 and the lower ends of the electroconductive members 14 are fixed to a gas tank 16 with an adhesive such as glass sealant.

Since the cell stack unit 18 of the present embodiment includes the above-described cells 1, the long-time reliability of the cell stack unit 18 can be enhanced.

(Electrochemical Module)

Figure 5:
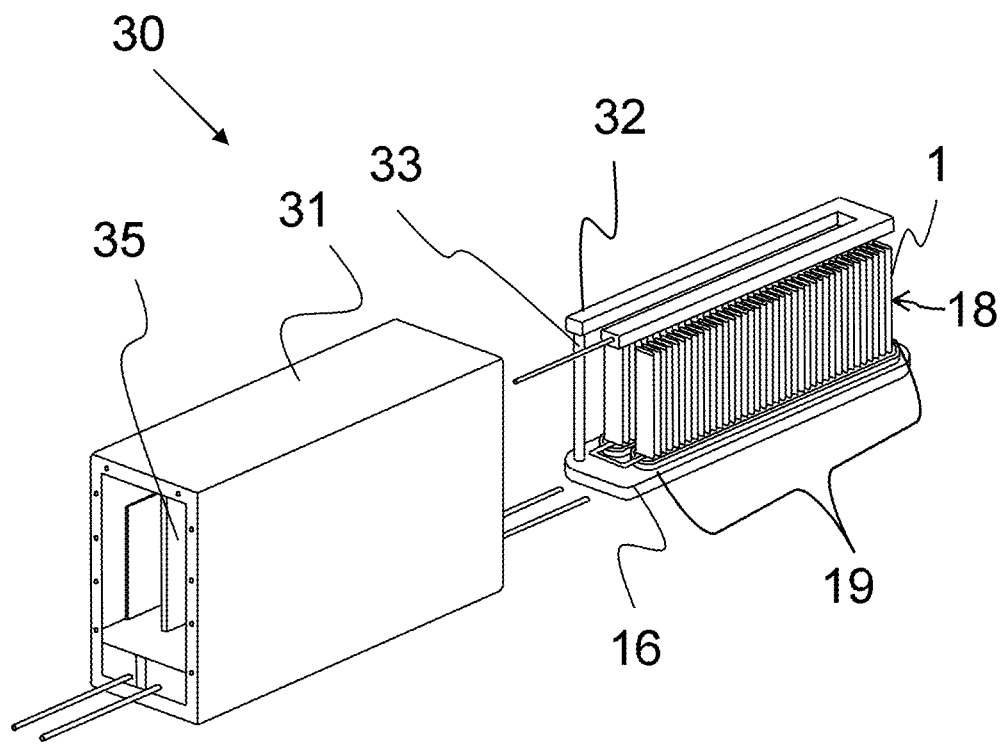
FIG. 5 is an external perspective view of an electrochemical module including the cell stack unit shown in FIGS. 4A and 4B, showing a state where the cell stack unit is being incorporated into a housing.

FIG. 5 is an external perspective view of a fuel cell module 30 that is an example of an electrochemical module including the cell stack unit 18 contained in a housing, illustrating a state where the cell stack unit 18 shown in FIGS. 4A and 4B is being incorporated into a rectangular housing 31. More specifically, FIG. 5 illustrates the state where the cell stack unit 18 and a reformer 32 are drawn backward out of the housing 31 some parts (front and rear faces) of which are removed. In the fuel cell module 30 shown in FIG. 5, the cell stack unit 18 can be slidably incorporated into the housing 31.

The fuel cell module 30 includes the reformer 32 that reforms a raw fuel such as natural gas or kerosene into a fuel gas to produce the fuel gas used in the cell 1. The reformer 32 is disposed above the fuel cell stack unit 18. The fuel gas produced in the reformer 32 is delivered to the gas tank 16 through the gas flow tube 33 and then supplied from the gas tank 16 to the gas passages 3 in the cell 1.

In FIG. 5, an oxygen-containing gas introducing member 35 within the housing 31 is disposed between a pair of the fuel cell stack units 18 arranged along the gas tank 16. Then, an oxygen-containing gas is supplied from the lower ends of the cells 1 to the upper ends of the cells along the flow of the fuel gas. The fuel gas discharged from the gas passages 3 of the cell 1 shown in FIG. 1A is allowed to react with an oxygen-containing gas and burned at the upper end of the cell 1, thereby increasing the temperature of the cell 1. Thus the cell stack unit 18 can be started rapidly. By burning the fuel gas discharged from the gas passages 3 of the cell 1 and the oxygen-containing gas at the upper end of the cell 1, the reformer 32 disposed over the cells 1 (fuel cell stack unit 18) is heated. Thus, reforming reaction occurs efficiently in the reformer 32.

Since the fuel cell module 30 of the present embodiment includes the above-described cell stack unit 18 contained in the housing 31, long-time reliability of the fuel cell module 30 can be enhanced.

(Electrochemical Apparatus)

Figure 6:
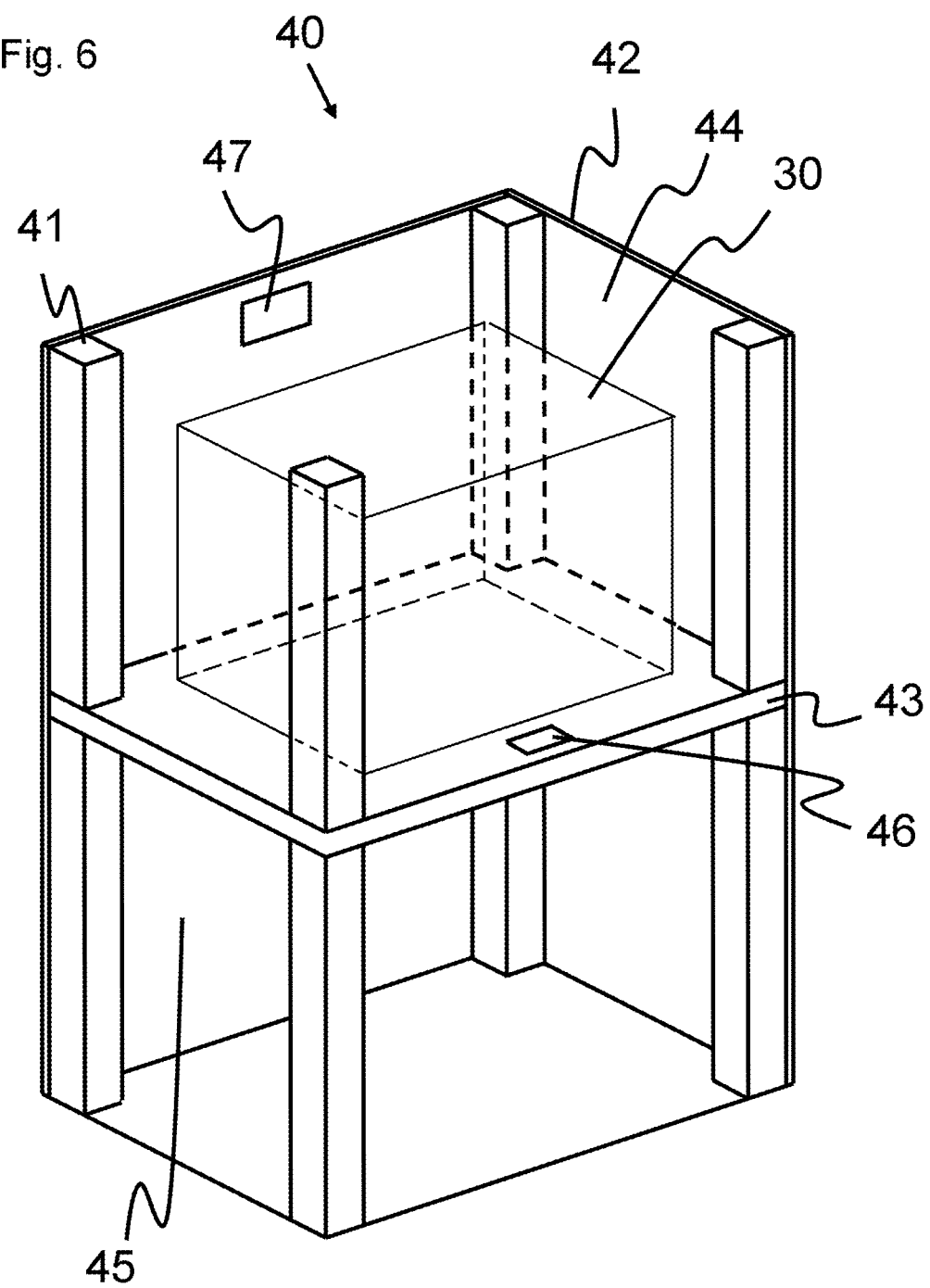
FIG. 6 is a perspective view of an electrochemical apparatus including the electrochemical module shown in FIG. 5.

FIG. 6 is a perspective view of a fuel cell apparatus that is an example of the electrochemical apparatus including the fuel cell module 30 shown in FIG. 5 and an auxiliary device configured to operate the fuel cell module 30, and an external case enclosing the fuel cell module and the auxiliary device. Some of the components are omitted from FIG. 6.

In the fuel cell apparatus 40 shown in FIG. 6, the interior of the external case including struts 41 and external plates 42 is vertically divided into two sections by a partition plate 43. The upper section is a module housing space 44 in which the fuel cell module 30 is accommodated, and the lower section is an auxiliary device housing space 45 in which the auxiliary device configured to operate the fuel cell module 30 is accommodated. The auxiliary device in the auxiliary housing space 45 is not shown in the figure.

The partition plate 43 is provided therein with an air flow port 46 through which air is introduced to the module housing space 44 from the auxiliary device housing space 45, and one or some of the external plates 42 defining the module housing space 44 are provided therein with an exhaust port 47 through which air is evacuated from the module housing space 44.

Since the fuel cell apparatus 40 contains the fuel cell module 30 capable of enhancing reliability in the module housing space 44, the reliability of the fuel cell apparatus 40 can be enhanced.

The present invention is not limited to the above-described embodiment, and various modifications and improvements may be made without departing from the spirit and scope of the invention. For example, the fuel cell may have a structure in which an oxygen electrode layer, an electrolyte layer and a fuel electrode layer are disposed in that order on an electroconductive supporting member. Although, in the above-described embodiment, the fuel electrode layer 8, the electrolyte layer 9 and the oxygen electrode layer 10 are stacked on the periphery of the supporting member 2, the supporting member 2 is not necessarily required, or the supporting member 2 may double as a fuel electrode layer.

Although the above embodiment has described a hollow flat electrolyte fuel cell, the fuel cell may of course be of cylindrical electrolyte or of flat electrolyte. Intermediate layers may be added between members according to functions. Although the above embodiment has described a fuel cell, and a cell stack unit, a fuel cell module and a fuel cell apparatus using the fuel cell, the invention is not limited to these and may be applied to an electrolysis cell (SOEC) that generates hydrogen and oxygen ($O_2$) by applying steam and voltage to the cell for electrolysis of steam (water), and to an electrolysis cell stack unit, an electrolysis module and an electrolysis apparatus each including the electrolysis cell.

EXAMPLES

First, NiO powder having an average particle size of 0.5 µm and $Y_2O_3$ powder having an average particle size of 0.9 µm were mixed into a clay. The Clay, to which an organic binder and a solvent were added, was formed into an electroconductive supporting member compact by extrusion followed by drying and degreasing. In the electroconductive supporting member compact after firing and reduction, the NiO accounted for 48% of the volume of the compact, and the $Y_2O_3$ accounted for 52% of the volume.

Next, a binder powder of an acrylic resin (low molecular weight) was added to a powder of $ZrO_2$ solid solution, having a particle size of 0.8 µm when measured by a microtrac method, containing 8% by mole of Y (electrolyte layer material powder). The resulting electrolyte layer material powder, a binder powder of an acrylic resin (high molecular weight) and a solvent were mixed into a slurry. The slurry was formed into an electrolyte layer sheet by a doctor blade method.

A complex oxide containing 90% by mole of $CeO_2$ and 10% by mole of rare-earth metal oxides ($GdO_{1.5}$, $SmO_{1.5}$) was pulverized with a solvent isopropyl alcohol (IPA) in a vibration mill or a ball mill and then calcined at 900° C. for 4 hours. The calcined material was subjected to cracking in the ball mill to adjust the aggregation of the ceramic particles. To this powder, an acrylic binder and toluene were added to prepare a slurry for forming an intermediate layer compact.

In addition, a slurry was prepared for a fuel electrode layer by mixing a NiO powder having an average particle size of 0.5 µm, a powder of $ZrO_2$ solid solution containing $Y_2O_3$, an organic binder and a solvent. The slurry was applied to the surface of the electrolyte layer sheet by screen printing and dried into a fuel electrode layer compact. Subsequently, the slurry for an intermediate layer was applied to the surface of the electrolyte layer sheet opposite the fuel electrode layer compact by screen printing and dried into an intermediate layer compact.

The resulting multilayer composite compact including the electrolyte layer sheet, and the intermediate layer compact and fuel electrode layer compact on the surfaces of the electrolyte layer sheet was stacked at a predetermined position on the electroconductive supporting member compact in such a manner that the surface of the fuel electrode layer compact faced inward (faced the supporting member). Subsequently, the multilayer composite compact or a stack of the compacts was calcined at 1000° C. for 3 hours.

A slurry for an interconnector was prepared by mixing $La(Mg_{0.3}Cr_{0.7})_{0.96}O_3$, an organic binder and a solvent. Furthermore, raw materials of Ni and YSZ were mixed and dried, and an organic binder and a solvent were added to the mixture to prepare an adhesion layer slurry. The resulting adhesion layer slurry was applied to a portion (portion at which the electroconductive supporting member was exposed) of the electroconductive supporting member not provided with the fuel electrode layer (and the electrolyte layer). Thus an adhesion layer compact was formed on the supporting member, and then the interconnector layer slurry was applied to the surface of the adhesion layer compact. After removing the binders from the multilayer composite compact, the multilayer composite compact was subjected to simultaneous sintering at 1450° C. in an atmosphere containing oxygen for 2 hours.

Next, a $La_{0.6}Sr_{0.4}Co_{0.2}Fe_{0.8}O_3$ powder having an average particle size of 10 µm, produced by liquid phase synthesis using a citrate method was pulverized in a ball mill. The pulverized powder was adjusted into a secondary material powder for the oxygen electrode layer, having the particle size distribution shown in Table 1. At this time, for samples other than Sample Nos. 6 and 9, the pulverized powder was recalcined at a predetermined temperature. A binder, isopropyl alcohol and a pore-forming agent were added to the secondary material powder to prepare a paste. The paste was applied to the surface of the intermediate layer of the multilayer composite compact by screen printing to form an oxygen electrode layer compact. The oxygen electrode layer compact was burned at 1100° C. for 4 hours, thereby forming an oxygen electrode layer. Thus, the cell shown in FIGS. 1A and 1B was completed. For Sample No. 9, the secondary material powder was prepared by spray pyrolysis.

Next, hydrogen gas was introduced into the cell and the electroconductive supporting member and the fuel electrode layer were reduced at 850° C. for 10 hours.

The resulting cell measured 25 mm×200 mm, and the electroconductive supporting member had a thickness (thickness between the flat faces n) of 2 mm and an open porosity of 35%. The fuel electrode layer had a thickness of 10 µm and an open porosity of 24%. The electrolyte layer had a thickness of 50 µm. The oxygen electrode layer had a thickness of 100 μm and the overall porosity of the oxygen electrode layer was adjusted in the range of 30% to 35%. The measurement results, including the pore size distribution of the oxygen electrode layer, are shown in Tables 1 and 2.

The thickness of each member and the thickness of the oxygen electrode layer at the flat portion of the electroconductive supporting member were measured using micrographs of electron scanning microscopy (SEM).

The oxygen electrode layer was observed through a scanning electron microscope (SEM) at a magnification of 500 times to identify pores in a view, and the pore sizes were calculated using imaginary circles estimated from the areas of the pores. Thus the pore size distribution of low-magnification observation (second pores and third pores) was obtained using thus calculated pore size and the number of pores. Then, the SEM magnification was increased to 3000 times, and the pore size distribution of high-magnification observation (first pores) was obtained in the same manner as in the low-magnification observation. These pore size distributions were combined into a total pore size distribution of the entirety of the oxygen electrode layer, and the pore size distributions of first pores, second pores and third pores were obtained by peak separation. Using these pore size distributions, the largest value and area of each peak were estimated, and average values were calculated for five photographs.

For the porosity of the oxygen electrode layer, the shapes of the pores in five SEM micrographs of an arbitrary polished section were examined in the same manner as above using an image analyzer, and the average aspect ratios of the first pores and the second pores were calculated. For calculating the aspect ratio of the first pores, first pores having pore sizes from the pore size corresponding to the largest value of the first peak to the minimum pore size of the first peak were extracted from the SEM micrographs taken at a magnification of 3000 times. For calculating the aspect ratio of the second pores, second pores having pore sizes from the pore size corresponding to the largest value of the second peak to the maximum pore size of the second peak were extracted from the SEM micrographs at a magnification of 500 times.

Five arbitrary points of the oxygen electrode layer were examined by the SEM observation at a magnification of 500 times, and the proportions of the porous portion, the dense portion and the empty portion were estimated according to the above-described definitions. Furthermore, the boundary between the porous portion and the dense was identified, and the shape of the dense portion was determined. In the Tables, the ratio: (square of the perimeter length of the dense portion)/(area of the dense portion) is represented as "(square of perimeter length)/area".

The perimeter lengths of the dense portions of Sample Nos. 1 to 5, 8 and 10 were each 10 times or more those of the first pores. For Sample No. 7, the perimeter length of the dense portion was 8 times that of the first pores.

The power generation performance of each cell was evaluated. The power density (0.3 A/cm$^2$, 750° C.) of the cell at the beginning of power generation was measured. After the cell was operated for 1000 hours, the reduction rate of the power density was measured relative to the power density at the beginning of power generation. Also, the potential drop representing the increase in actual resistance of the cell was measured after the 1000-hour operation. In the Table, these values are represented as initial power density, reduction rate of power density, and potential drop. The results are shown in Table 2.

TABLE 1

| | | | | | | | | Oxygen electrode layer | | | | |
|---|---|---|---|---|---|---|---|---|---|---|---|---|
| Sample No. | Secondary material particle size (μm) | | | Pore-forming agent | p1t (μm) | p2t (μm) | p3t (μm) | First pores (Number %) | Aspect ratio | Second pores (Number %) | Aspect ratio | Third pores (Number %) |
| | D10 | D50 | D90 | | | | | | | | | |
| 1 | 0.1 | 0.3 | 5.0 | 10% | 0.1 | 0.2 | 4 | 90 | 1 | 9 | 5 | 1 |
| 2 | 0.4 | 2.0 | 25.0 | 10% | 0.3 | 1 | 15 | 85 | 1.1 | 14 | 5 | 1 |
| 3 | 1.0 | 10.0 | 50.0 | 10% | 0.8 | 5 | 25 | 80 | 1.5 | 19 | 4 | 1 |
| 4 | 0.4 | 2.0 | 25.0 | 3% | 0.3 | 1 | 15 | 85.2 | 1.2 | 14.5 | 5 | 0.3 |
| 5 | 0.4 | 2.0 | 25.0 | 20% | 0.3 | 1 | 15 | 85 | 1.1 | 13 | 5 | 2 |
| 6 | 0.4 | 0.5 | 1.0 | 10% | 0.3 | — | 7 | 98 | 1 | 0 | — | 2 |
| 7 | 2.0 | 13.0 | 35.0 | 10% | 1.5 | — | 18 | 70 | 1.5 | 28 | — | 2 |
| 8 | 0.4 | 2.0 | 25.0 | — | 0.3 | 1 | — | 90 | 1.3 | 10 | 6 | 0 |
| 9 | 0.1 | 0.3 | 0.6 | 10% | 0.1 | — | 0.7 | 99 | 1 | 0 | — | 1 |
| 10 | 0.3 | 0.8 | 7.0 | 10% | 0.2 | 1.8 | 7 | 80 | 1 | 18 | 5 | 2 |

TABLE 2

| | Oxygen electrode layer | | | | Initial power density W/cm$^2$ | Reduction rate of power density (%) | Potential drop (mV) |
|---|---|---|---|---|---|---|---|
| Sample No. | Porous portion (Area %) | Dense portion (Area %) | Empty portion (Area %) | (Square of perimeter length)/Area | | | |
| 1 | 30 | 30 | 40 | 38 | 0.245 | 0.8 | 160 |
| 2 | 35 | 25 | 40 | 52 | 0.243 | 0.6 | 135 |
| 3 | 40 | 20 | 40 | 68 | 0.241 | 0.4 | 143 |
| 4 | 55 | 33 | 12 | 51 | 0.238 | 0.5 | 140 |
| 5 | 25 | 15 | 60 | 54 | 0.239 | 0.6 | 140 |
| 6 | 60 | 0 | 40 | — | 0.247 | 2.4 | 210 |

TABLE 2-continued

| Sample No. | Oxygen electrode layer | | | | Initial power density W/cm$^2$ | Reduction rate of power density (%) | Potential drop (mV) |
|---|---|---|---|---|---|---|---|
| | Porous portion (Area %) | Dense portion (Area %) | Empty portion (Area %) | (Square of perimeter length)/ Area | | | |
| 7 | 50 | 10 | 40 | 28 | 0.231 | 0.3 | 180 |
| 8 | 60 | 40 | 0 | 50 | 0.231 | 0.8 | 207 |
| 9 | 60 | 0 | 40 | — | 0.250 | 3.1 | 190 |
| 10 | 30 | 25 | 45 | 50 | 0.248 | 0.4 | 140 |

The results shown in Tables 1 and 2 show that Sample No. 6 whose oxygen electrode layer was formed of a uniform secondary material powder having a narrow pore size distribution having no second peak exhibited considerable degradation in power generation performance. Also, Sample No. 7 in which the secondary material powder was recalcined at a higher temperature exhibited a pore size distribution having no second peak and larger first pores. The air content in the oxygen electrode layer of this sample was reduced and the initial power density was low. Also, Sample No. 8 in which a pore-forming agent was not added exhibited a pore size distribution having no third peak. The air content in the oxygen electrode layer of this sample was also reduced and the initial power density was low. Sample No. 9 in which a uniform secondary material powder prepared by spray pyrolysis was used exhibited a pore size distribution having no second peak, and a large reduction rate of power density.

On the other hand, Samples Nos. 1 to 5 and 10, each including an oxygen electrode layer formed of a specific secondary material powder calcined at a specific recalcination temperature exhibited good initial power generation performance and small degradation in performance. In addition, each pore size distribution had three peaks. Also, Samples Nos. 2 to 5 and 10, in which the largest value p1$t$ of the first pores lay at a pore size of 0.15 µm or more, exhibited smaller potential drops after the cell was operated for 1000 hours. For Sample Nos. 1 to 5 and 10, the distribution of the Sr concentration in the oxygen electrode layer was examined with an electron probe microanalyzer (EPMA), and it was found that Sample No. 1 had a portion having a higher Sr concentration than Samples Nos. 2 to 5 and 10 around the interface between the oxygen electrode layer and the supporting member.

REFERENCE SIGNS LIST 1 cell
2 electroconductive supporting member (supporting member)
3 fuel gas passage
8 fuel electrode layer
9 electrolyte layer
10 oxygen electrode layer
11 interconnector layer
12 intermediate layer
20 first pore
21 second pore
22 third pore
24 porous portion
25 dense portion
26 empty portion
p1 first peak
p2 second peak
p3 third peak
p1$t$ largest value of the first peak
p2$t$ largest value of the second peak
p3$t$ largest value of the third peak

What is claimed is:
1. A cell comprising:
a solid oxide electrolyte layer;
a fuel electrode layer on a surface of the electrolyte layer;
an oxygen electrode layer on another surface of the electrolyte layer,
wherein
the oxygen electrode layer comprises regions with differing porosity, the regions comprising:
a porous portion,
a dense portion having a lower porosity than the porous portion, and
an empty portion having a higher porosity than the porous portion; and
in a cross-section of the oxygen electrode layer,
a total area of the porous portion accounts for 25 percent to 55 percent of a total area of the oxygen electrode layer,
a total area of the dense portion accounts for 15 percent to 35 percent of the total area of the oxygen electrode layer, and
a total area of the empty portion accounts for 10 percent to 60 percent of the total area of the oxygen electrode layer.
2. The cell according to claim 1, wherein,
in a cross-section of the oxygen electrode layer,
the porous portion comprises a plurality of pores having a pore size and
the dense portion has a perimeter length 10 times or more than the pore size.
3. The cell according to claim 2, wherein,
in a cross-section of the oxygen electrode layer,
the dense portion has a perimeter length and an area, and
a ratio of the square of the perimeter length to the area of the dense portion is in a range of 40 to 100.
4. The cell according to claim 1, wherein,
in a cross-section of the oxygen electrode layer,
the dense portion has a perimeter length and an area, and
a ratio of the square of the perimeter length to the area of the dense portion is in a range of 40 to 100.
5. A cell stack unit comprising a plurality of the cells according to claim 1, wherein
the plurality of the cells are connected to one another with power collecting members.
6. An electrochemical module comprising:
the cell stack unit according to claim 5 and
a housing containing the cell stack unit.
7. The cell according to claim 1, wherein
the porous portion is surrounded by the dense portion.

8. A cell comprising:
a solid oxide electrolyte layer;
a fuel electrode layer on a surface of the electrolyte layer;
an oxygen electrode layer on another surface of the electrolyte layer,
wherein
the oxygen electrode layer comprises regions with differing porosity, the regions comprising:
a porous portion,
a dense portion having a lower porosity than the porous portion, and
an empty portion having a higher porosity than the porous portion; and
in a cross-section of the oxygen electrode layer,
the porous portion comprises a plurality of pores having a pore size and
the dense portion has a perimeter length 10 times or more than the pore size.

9. The cell according to claim 8, wherein,
in a cross-section of the oxygen electrode layer,
the dense portion has a perimeter length and an area, and
a ratio of the square of the perimeter length to the area of the dense portion is in a range of 40 to 100.

10. The cell according to claim 8, wherein
the porous portion is surrounded by the dense portion.

11. A cell stack unit comprising a plurality of the cells according to claim 8, wherein
the plurality of the cells are connected to one another with power collecting members.

12. An electrochemical module comprising:
the stack unit according to claim 8 and
a housing containing the cell stack unit.

13. A cell comprising:
a solid oxide electrolyte layer;
a fuel electrode layer on a surface of the electrolyte layer;
an oxygen electrode layer on another surface of the electrolyte layer,
wherein
the oxygen electrode layer comprises regions with differing porosity, the regions comprising:
a porous portion,
a dense portion having a lower porosity than the porous portion, and
an empty portion having a higher porosity than the porous portion; and
in a cross-section of the oxygen electrode layer,
the dense portion has a perimeter length and an area, and
a ratio of the square of the perimeter length to the area of the dense portion is in a range of 40 to 100.

14. The cell according to claim 13, wherein
the porous portion is surrounded by the dense portion.

15. A cell stack unit comprising a plurality of the cells according to claim 13, wherein
the plurality of the cells are connected to one another with power collecting members.

16. An electrochemical module comprising:
the stack unit according to claim 13 and
a housing containing the cell stack unit.

* * * * *

UNITED STATES PATENT AND TRADEMARK OFFICE
CERTIFICATE OF CORRECTION

| | |
|---|---|
| PATENT NO. | : 11,450,859 B2 |
| APPLICATION NO. | : 16/430468 |
| DATED | : September 20, 2022 |
| INVENTOR(S) | : Toru Nakayama et al. |

It is certified that error appears in the above-identified patent and that said Letters Patent is hereby corrected as shown below:

In the Claims

Claim 12 at Column 20, Line 2, insert --cell-- between 'the' and 'stack'.

Claim 12 at Column 20, Line 2, remove 'claim 8' and insert --claim 11-- instead.

Claim 16 at Column 20, Line 28, insert --cell-- between 'the' and 'stack'.

Claim 16 at Column 20, Line 28, remove 'claim 13' and insert --claim 15-- instead.

Signed and Sealed this
Twenty-seventh Day of December, 2022

Katherine Kelly Vidal
*Director of the United States Patent and Trademark Office*